(12) United States Patent
Matsuyama

(10) Patent No.: US 8,670,756 B2
(45) Date of Patent: Mar. 11, 2014

(54) MOBILE TERMINAL, IN-VEHICLE APPARATUS, COMMUNICATION SYSTEM, AND CONTROL METHOD FOR MOBILE TERMINAL

(75) Inventor: Shigeo Matsuyama, Obu (JP)

(73) Assignee: Denso Corporation, Kariya (JP)

( * ) Notice: Subject to any disclaimer, the term of this patent is extended or adjusted under 35 U.S.C. 154(b) by 27 days.

(21) Appl. No.: 13/439,157

(22) Filed: Apr. 4, 2012

(65) Prior Publication Data

US 2012/0258702 A1 Oct. 11, 2012

(30) Foreign Application Priority Data

Apr. 5, 2011 (JP) ................................ 2011-083505

(51) Int. Cl.
*H04W 4/04* (2009.01)
*H04W 52/02* (2009.01)
(52) U.S. Cl.
USPC ......... 455/420; 455/418; 455/345; 455/456.4
(58) Field of Classification Search
USPC ............... 455/410–411, 414.1, 418–420, 455/456.1–456.6, 550.1, 575.9
See application file for complete search history.

(56) References Cited

U.S. PATENT DOCUMENTS

| 7,209,410 | B2 | 4/2007 | Yamanushi et al. | |
|---|---|---|---|---|
| 2004/0198306 | A1* | 10/2004 | Singh et al. | 455/345 |
| 2010/0286912 | A1 | 11/2010 | Inoue | |
| 2011/0009107 | A1 | 1/2011 | Guba et al. | |
| 2011/0105097 | A1* | 5/2011 | Tadayon et al. | 455/418 |

FOREIGN PATENT DOCUMENTS

| JP | 2002-081957 | 3/2002 |
|---|---|---|
| JP | 2003-065789 | 3/2003 |
| JP | 2003-332932 | 11/2003 |
| JP | 2004-022139 | 1/2004 |
| JP | 2005-250853 | 9/2005 |
| JP | 2006-153695 | 6/2006 |
| JP | 2006-242578 | 9/2006 |
| JP | 2007-216845 | 8/2007 |
| JP | 2009-129504 | 6/2009 |
| JP | 2009-294000 | 12/2009 |
| WO | WO2010/129939 | 11/2010 |

OTHER PUBLICATIONS

Office Action issued May 7, 2013 in corresponding Japanese Application No. 2011-083505 (with English translation).
Office Action issued Nov. 19, 2013 in corresponding Japanese Application No. 2011-083505 (with English translation).

* cited by examiner

*Primary Examiner* — Kashif Siddiqui
(74) *Attorney, Agent, or Firm* — Harness, Dickey & Pierce, PLC

(57) ABSTRACT

A mobile terminal for communicating with an in-vehicle apparatus includes: a mobile connection detection device for detecting connection between the mobile terminal and the in-vehicle apparatus; and a mobile control device for controlling a plurality of functions, each of which is executed by consuming electric power of the mobile terminal. When the mobile connection detection device detects the connection, the mobile control device suppresses or stops executing one of the functions in the mobile terminal. This enables to save power consumption of the mobile terminal without turning off the mobile terminal when it is brought into a vehicle compartment.

29 Claims, 7 Drawing Sheets

MOBILE TERMINAL, IN-VEHICLE APPARATUS, COMMUNICATION SYSTEM, AND CONTROL METHOD FOR MOBILE TERMINAL

CROSS REFERENCE TO RELATED APPLICATION

This application is based on Japanese Patent Application No. 2011-83505 filed on Apr. 5, 2011, the disclosure of which is incorporated herein by reference.

TECHNICAL FIELD

The present disclosure relates to a mobile terminal and an in-vehicle apparatus, which are communicated with each other, a communication system including the mobile terminal and the in-vehicle apparatus, and a method for controlling the mobile terminal.

BACKGROUND

Recently, there is an increasing use of various mobile terminals such as portable music players capable of recording a large amount of music data and highly functional mobile telephones. Users might often carry these mobile terminals because the terminals are lightweight and small-sized. As described in patent document 1, for example, the user may bring the mobile terminal into a vehicle compartment, connect the mobile terminal to an in-vehicle audio system, and listen to the music using an in-vehicle speaker.

However, many mobile terminals do not have large-capacity batteries for the purpose of lightweight and miniaturization. A mobile terminal might burn battery power while connected to an in-vehicle audio system and become inoperable due to power shortage after the mobile terminal is disconnected from the in-vehicle audio system. According to patent document 1, the mobile terminal is configured to turn off the power immediately after the music reproduction ends. This can minimize power consumption of the mobile terminal.

Patent Document 1: JP-A-2009-129504

As described in patent document 1, however, turning off the mobile terminal disables all functions of the mobile terminal. Some functions may need to remain available on a highly functional mobile telephone having multiple functions.

SUMMARY

In view of the above-described problem, it is an object of the present disclosure to provide a mobile terminal, an in-vehicle apparatus, and a communication system including a mobile terminal and an in-vehicle apparatus. It is another object to provide a method for controlling a mobile terminal. In the mobile terminal, the in-vehicle apparatus and the communication system, power consumption of the mobile terminal is saved without turning off the mobile terminal when the terminal is brought into a vehicle compartment.

According to a first aspect of the present disclosure, a mobile terminal for communicating with an in-vehicle apparatus includes: a mobile connection detection device for detecting connection between the mobile terminal and the in-vehicle apparatus; and a mobile control device for controlling a plurality of functions, each of which is executed by consuming electric power of the mobile terminal. When the mobile connection detection device detects the connection, the mobile control device suppresses or stops executing one of the functions in the mobile terminal. This enables to save power consumption of the mobile terminal without turning off the mobile terminal when it is brought into a vehicle compartment.

According to a second aspect of the present disclosure, an in-vehicle apparatus for communicating with a portable mobile terminal, includes: an in-vehicle connection detection device for detecting connection between the in-vehicle apparatus and the mobile terminal; and an in-vehicle control device for transmitting an instruction signal to the mobile terminal. The instruction signal represents a control of a plurality of functions in the mobile terminal, the functions executed by consuming electric power of the mobile terminal, and when the in-vehicle connection detection device detects the connection, the in-vehicle control device transmits the instruction signal to the mobile terminal so as to suppress or stop executing one of the functions in the mobile terminal. This enables to save power consumption of the mobile terminal without turning off the mobile terminal when it is brought into a vehicle compartment.

According to a third aspect of the present disclosure, a communication system includes: an in-vehicle apparatus mounted on a vehicle; and a mobile terminal for communicating with the in-vehicle apparatus. The in-vehicle apparatus includes: a vehicle connection detection device for detecting connection between the in-vehicle apparatus and the mobile terminal; and an in-vehicle control device that controls a first function in the in-vehicle apparatus, the first function executed by consuming electric power. The mobile terminal includes: a mobile connection detection device for detecting connection between the mobile terminal and the in-vehicle apparatus; and a mobile control device for controlling a second function in the mobile terminal, the second function executed by consuming electric power of the mobile terminal, and equivalent to the first function. When the vehicle connection detection device detects the connection, the in-vehicle control device controls the first function to be active. When the mobile connection detection device detects the connection, the mobile control device controls the second function to suppress or stop executing the second function. This enables to save power consumption of the mobile terminal without turning off the mobile terminal when it is brought into a vehicle compartment.

According to a fourth aspect of the present disclosure, a computer readable medium comprising instructions being executed by a computer, the instructions including a computer-implemented method for controlling a mobile terminal to communicate with an in-vehicle apparatus mounted on a vehicle, wherein the mobile terminal includes: a mobile connection detection device for detecting connection between the mobile terminal and the in-vehicle apparatus; and a mobile control device for controlling a plurality of functions, each of which is executed by consuming electric power of the mobile terminal, the instructions includes: controlling the mobile control device to suppress or stop executing one of functions in the mobile terminal when the mobile connection detection device detects the connection. This enables to save power consumption of the mobile terminal without turning off the mobile terminal when it is brought into a vehicle compartment.

According to a fifth aspect of the present disclosure, a method for controlling a plurality of functions in a mobile terminal, which communicates with an in-vehicle apparatus mounted on a vehicle, the functions executed by consuming electric power of the mobile terminal, the method includes: detecting connection between the mobile terminal and the in-vehicle apparatus; and suppressing or stopping execution of one of the functions in the mobile terminal when the connection is detected between the mobile terminal and the in-vehicle apparatus. This enables to save power consumption of the mobile terminal without turning off the mobile terminal when it is brought into a vehicle compartment.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)

Figure 1:
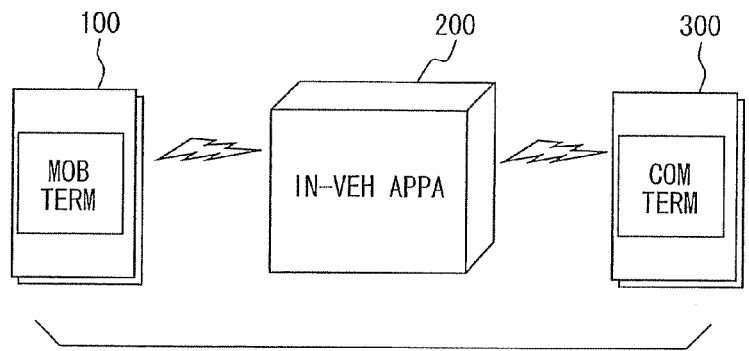
FIG. 1 is a diagram schematically showing an overall configuration of a communication system.
Figure 2:
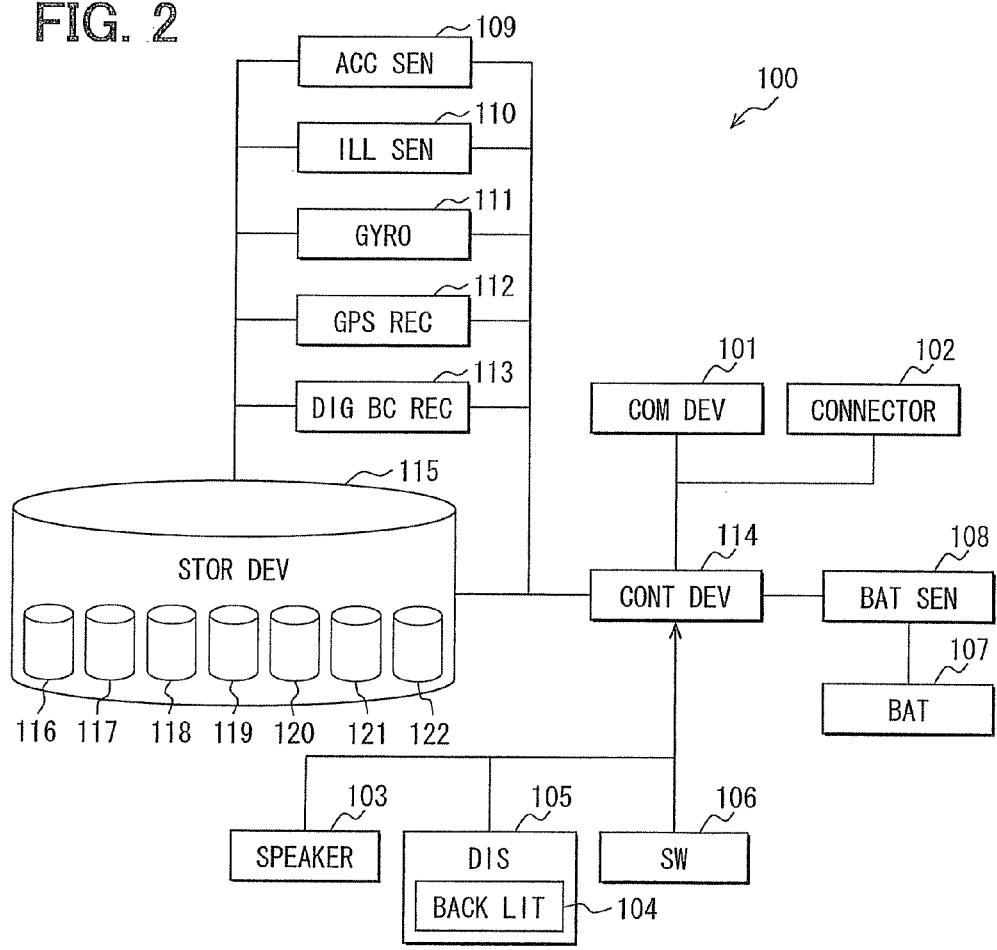
FIG. 2 is a diagram schematically showing a configuration of a mobile terminal.
Figure 3:
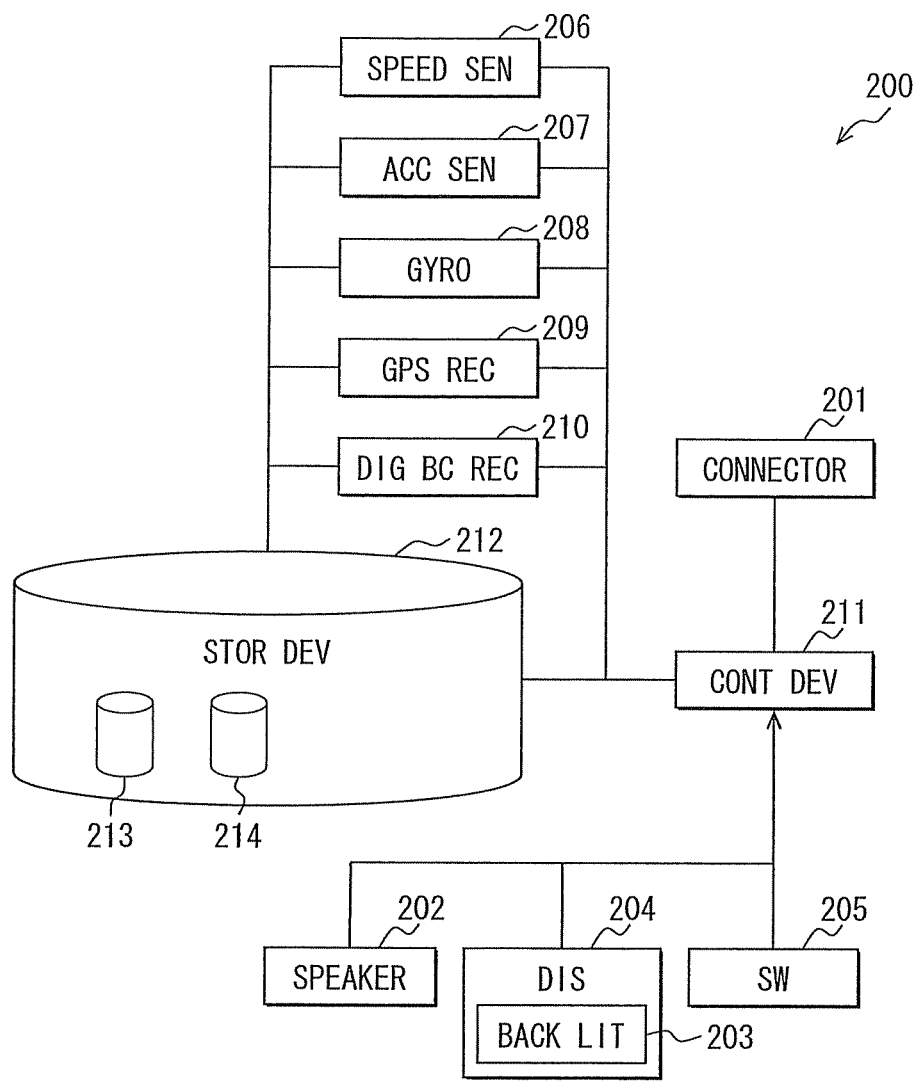
FIG. 3 is a diagram schematically showing a configuration of an in-vehicle apparatus.

The following describes a configuration of a communication system according to the first embodiment with reference to FIGS. 1 through 3. FIG. 1 schematically shows an overall configuration of the communication system including a mobile terminal 100, an in-vehicle apparatus 200, and a communication terminal 300.

The mobile terminal 100 represents a mobile telephone, for example, and is capable of wired or wireless communication with the in-vehicle apparatus 200 each other. Similarly, the communication terminal 300 is capable of wired or wireless communication with the in-vehicle apparatus 200. The communication terminal 300 may represent a mobile telephone, a portable music player, or a combination of both. According to the embodiment, the communication terminal 300 and the mobile terminal 100 have the same configuration and the following description omits the configuration of the communication terminal 300.

FIG. 2 schematically shows the configuration of the mobile terminal 100. The mobile terminal 100 includes a communication device 101, a connector 102, a speaker 103, a backlight 104, a display 105, a battery 107, a battery sensor 108, an acceleration sensor 109, an illuminance sensor 110, a gyroscope 111, a GPS (Global Positioning System) receiver 112, a digital broadcasting receiver 113, a control device 114, and a storage device 115.

The communication device 101 provides a communication interface for connection to public communication networks such as the Internet. Public communication networks are used for wireless communication with servers (not shown). The connector 102 provides a wired or wireless connection interface for direct communication with the in-vehicle apparatus 200. The connector 102 includes a USB (Universal Serial Bus) connector as an example of wired connection and includes Bluetooth (registered trademark) as an example of wireless connection.

The speaker 103 generates sound. For example, the speaker 103 delivers music reproduced from a music reproduction application 116 to be described later. The display 105 represents a liquid crystal display including the backlight 104 (equivalent to a mobile illumination means according to the present disclosure), for example. The display 105 displays various information such as mail messages created from a mail application 119 to be described later. The switch 106 (equivalent to a mobile input means according to the present disclosure) is provided for user input operations. For example, the switch 106 may be configured as a touch panel so that it is integrated with the display 105.

The battery sensor 108 detects the stored electric quantity in the battery 107. The display 105 displays the stored electric quantity detected by the battery sensor 108 and notifies a user of the remaining amount of the battery 107.

The acceleration sensor 109 detects an acceleration of the mobile terminal 100. For example, the acceleration sensor 109 is configured so as to be capable of measuring accelerations in three directions, that is, X, Y, and Z axes. The acceleration detected by the acceleration sensor 109 is used to determine the vertical direction on the display 105.

The illuminance sensor 110 detects brightness around the mobile terminal 100. The backlight 104 for illuminating the display is adjusted in accordance with the brightness detected by the illuminance sensor 110.

The gyroscope 111 detects rotational motion magnitude such as an angle and angular velocity. The GPS receiver 112 receives radio wave from a GPS satellite (not shown). The received radio wave enables to calculate a current location, orientation, and speed.

The digital broadcasting receiver 113 is used for digital terrestrial broadcasting and receives radio wave transmitted from a broadcasting station (not shown). A digital broadcasting decode application 117 (to be described) decodes the received radio wave and enables to watch broadcasts and display listings.

The control device 114 (equivalent to a mobile control means according to the present disclosure) represents a computer that controls the mobile terminal 100 as a whole. The control device 114 controls functions that consume the battery 107 of the mobile terminal 100. The control device 114 includes, though not shown, a CPU, RAM as a work area for temporarily storing data, and a bus connecting these components. The CPU performs programs stored in the storage device 115 to implement the corresponding functions.

The storage device 115 represents flash memory or SD card (registered trademark), for example, and stores music data, phone book data, and programs as applications running on an operating system. The applications to be stored include, for example, the music reproduction application 116, the digital broadcasting decode application 117, navigation 118, a mail application 119, an incoming call animation 120, a Web browser 121, and a game application 122.

The music reproduction application 116 reproduces music data stored in the storage device 115 and outputs sound from the speaker 103. The digital broadcasting decode application 117 decodes a broadcast wave received by the digital broadcasting receiver 113 in order to display video or listings on the display 105 and output sound from the speaker 103. The navigation 118 periodically acquires a current location calculated by the GPS receiver 112 and displays the current location on a map. The calculation of current location may use values detected by the gyroscope 111. The navigation 118 displays a route to a predetermined destination on the display 105 and provides audio guidance on the route to the destination. The mail application 119 (e.g., JP-A No. 211266/2001) receives text input from the switch 106 operated by a user to create a mail message and transmits or receives the mail message via the communication device 101. The incoming call animation 120 (e.g., JP-A No. 148885/2001) displays an animation on the display 105 in response to an incoming call. The Web browser 121 functions as an application that makes connection to the Internet via the communication device 101 and browses through Web pages. The Web browser 121 downloads HTML files and image files from the Internet, analyzes layouts, and displays the contents on the display 105. The game application 122 (e.g., JP-A No. 230766/2003) mainly represents various game applications downloadable from the Internet. The applications 116 through 122 are based on known technologies and a detailed description is omitted for simplicity.

The mobile terminal 100 easily suffers from power shortage because the terminal contains many functions that consume the battery 107. In order to operate the navigation 118, for example, the GPS receiver 112 periodically receives GPS radio wave to measure the current location. The mobile terminal 100 transmits the current location to a center (not shown), receives map information containing the current location from the center, and displays the map information on the display 105. The battery 107 is consumed each time the GPS receiver 112 receives the GPS radio wave. Similarly, the battery 107 is consumed each time the Web browser 121 communicates with Internet servers. The mobile terminal 100 easily suffers from power shortage.

The following describes the configuration of the in-vehicle apparatus 200. FIG. 3 schematically shows the configuration of the in-vehicle apparatus 200. The in-vehicle apparatus 200 includes a connector 201, a speaker 202, a backlight 203, a display 204, a switch 205, a vehicle speed sensor 206, an acceleration sensor 207, a gyroscope 208, a GPS receiver 209, a digital broadcasting receiver 210, a control device 211, and a storage device 212.

The connector 201 provides a wired or wireless connection interface for direct communication with the mobile terminal 100. The connector 202 represents a USB connector as an example of wired connection and represents a Bluetooth connector as an example of wireless connection.

The speaker 202 generates sound. For example, the speaker 202 delivers music reproduced from a music reproduction application 213 to be described later. The display 204 represents a liquid crystal display including the backlight 203, for example. The display 204 displays various information such as broadcast video and listings decoded by a digital broadcasting decode application 214 (to be described). The switch 205 is provided for user input operations. For example, the switch 205 may be configured as a touch panel so that it is integrated with the display 204.

The vehicle speed sensor 206, the acceleration sensor 207, and the gyroscope 208 are equivalent to a driving state information acquisition means according to the present disclosure. The vehicle speed sensor 206 detects a vehicle speed. The acceleration sensor 207 detects longitudinal acceleration of a vehicle. The gyroscope 208 detects rotational motion magnitude such as a vehicle angle and angular velocity. A sensor (not shown) for detecting lateral acceleration may be provided in addition to the acceleration sensor 207 that detects longitudinal acceleration of a vehicle. The storage device 212 stores data of driving states detected by the sensors 206 through 208. The control device 211 references the data.

The GPS receiver 209 periodically receives radio wave from a GPS satellite and calculates a current location, orientation, and speed of a vehicle.

The digital broadcasting receiver 210 is used for digital terrestrial broadcasting and receives radio wave transmitted from a broadcasting station. Decoding the received radio wave enables to watch broadcasts and display listings.

The control device 211 (equivalent to an in-vehicle control means according to the present disclosure) represents a computer that controls the in-vehicle apparatus 200 as a whole. The control device 211 controls functions that consume the vehicle power. The control device 211 includes, though not shown, a CPU, RAM as a work area for temporarily storing data, and a bus connecting these components. The CPU performs programs stored in the storage device 212 to implement the corresponding functions.

The storage device 212 represents RAM and HDD, for example. The RAM stores values output from the sensors 206 through 208 and data received by the receivers 209 through 210. The HDD stores music data and programs for applications running on an operating system. Applications to be stored include the music reproduction application 213 and the digital broadcasting decode application 214.

The music reproduction application 213 reproduces music data stored in the storage device 212 and outputs sound from the speaker 202. The digital broadcasting decode application 214 decodes a broadcast wave received by the digital broadcasting receiver 210 in order to display video or listings on the display 204 and output sound from the speaker 202.

The in-vehicle apparatus 200 also contains many power-consuming functions. However, a vehicle battery (not shown) ensures higher capacity than that of the battery 107 of the mobile terminal 100. Operations of the functions hardly cause power shortage.

With reference to FIGS. 4 through 7, the following describes processes performed when the mobile terminal 100 is brought into a vehicle and is connected to the in-vehicle apparatus 200. It is assumed that an accessory switch is turned on in the vehicle. It is also assumed that the mobile terminal 100 is turned on to perform the functions that consume the battery 107.

Figure 4:
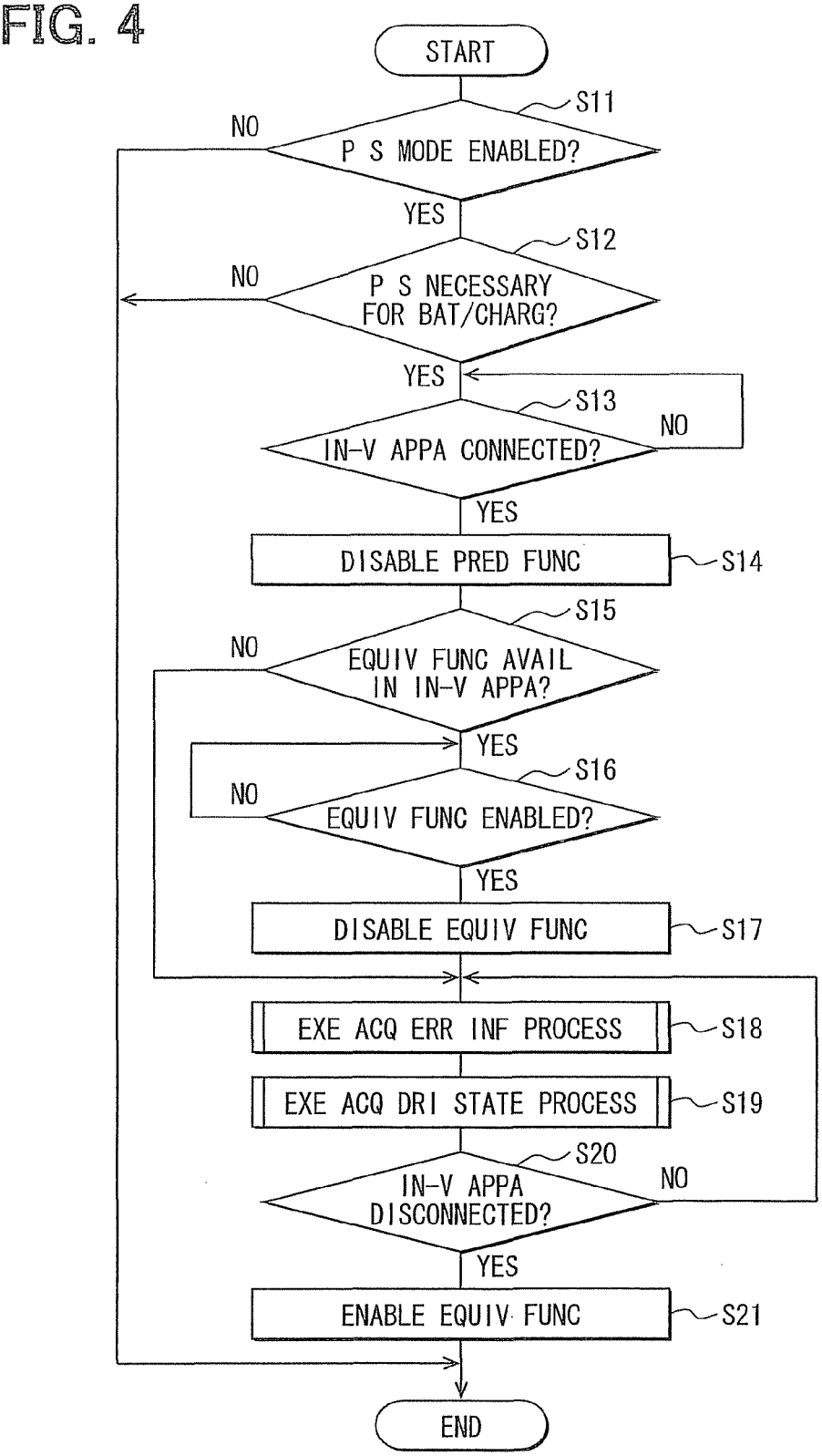
FIG. 4 is a flowchart showing a process flow in the mobile terminal.

FIG. 4 is a flowchart showing a process in the control device 114 of the mobile terminal 100. At step S11, the control device 114 determines whether power saving mode is enabled to save the power when the mobile terminal 100 is connected to the in-vehicle apparatus 200. A user needs to previously enable or disable the power saving mode from a menu on the mobile terminal 100, for example. The control device 114 terminates the process if the power saving mode is disabled (N at step S11). The control device 114 proceeds to step S12 if the power saving mode is enabled (Y at step S11).

At step S12, the control device 114 acquires the stored electric quantity of the battery 107 from the battery sensor 108. The control device 114 determines whether the stored electric quantity is less than a predetermined remaining amount. The control device 114 assumes the power saving control to be unnecessary and terminates the process if the stored electric quantity is larger than or equal to 70% of the total amount of the battery 107 (N at step S12), for example. The control device 114 proceeds to step S13 if the stored electric quantity is smaller than 70% (Y at step S12).

It may be preferable to determine whether an environment is capable of charging the battery 107 in addition to or instead of the determination based on the stored electric quantity. For example, the control device 114 determines whether the environment is capable of charging from a vehicle battery through a charge cable (not shown) or the connector 102. The control device 114 assumes the power saving control to be unnecessary and terminates the process if the environment is capable of charging (N at step S12). The control device 114 proceeds to step S13 if the environment is incapable of charging (Y at step S12).

At step S13 (equivalent to a mobile connection detection means according to the present disclosure), the control device 114 determines whether the mobile terminal 100 is communicably connected to the in-vehicle apparatus 200. When the connector 102 uses a USB connector, for example, the control device 114 determines successful connection if the mobile terminal 100 recognizes the in-vehicle apparatus 200. When the connector 102 uses a Bluetooth connector, the control device 114 determines successful connection if the mobile terminal 100 successfully establishes a communication line with the in-vehicle apparatus 200. Alternatively, it may be preferable to determine whether the in-vehicle apparatus 200 is communicably connected and complies with a Bluetooth profile needed for this process. The control device 114 waits until the connection is determined to be successful (N at step S13). The control device 114 proceeds to step S14 if the connection is determined to be successful. The determination at steps S11 and S12 may be placed after connection to the in-vehicle apparatus 200 is determined to be successful (Y at step S13).

At step S14, the control device 114 stops or suppresses a predetermined function simultaneously with successful connection to the in-vehicle apparatus 200. The storage device 115 may previously store which function to stop or suppress. A possible configuration may display a list of functions on the display 105, allow the user to operate the switch 106 and specify which function to stop or suppress, and store the specified function in the storage device 115.

For example, the control device 114 stops the Web browser 121 and the game application 122 because these functions are considered to be unused while the user is driving his or her vehicle. The control device 114 may suspend or completely terminate the application. The control device 114 may infrequently execute the application if it is active. For example, the control device 114 may allow the Web browser 121 to infrequently communicate with Internet servers or temporarily stop transmitting or receiving data. Decreasing the CPU load improves power saving of the mobile terminal 100.

On the other hand, the control device 114 keeps operating functions that need to be available after the user gets into the car. For example, the control device 114 keeps operating the music reproduction application 116 so that it can continue to reproduce music data. In addition, the control device 114 keeps operating an application being used by the user such as the mail application 119 that contains a mail message being created or edited.

At step S15 (equivalent to an equivalent function determination means according to the present disclosure), the control device 114 determines whether the in-vehicle apparatus 200 includes a function equivalent to that provided for the mobile terminal 100. The purpose is to communicably connect the mobile terminal 100 with the in-vehicle apparatus 200, stop a function in the mobile terminal 100, and alternatively operate the equivalent function in the in-vehicle apparatus 200.

As shown in FIGS. 2 and 3, for example, the mobile terminal 100 and the in-vehicle apparatus 200 include the displays 105 and 204 equivalent to each other as a screen display function. The speakers 103 and 302 are also equivalent to each other as an audio output function. The switches 106 and 205 are also equivalent to each other as an input function. The mobile terminal 100 and the in-vehicle apparatus 200 include the GPS receivers 112 and 209 equivalent to each other as a GPS radio wave reception function. The acceleration sensors 109 and 207 are also equivalent to each other as an acceleration detection function. The gyroscopes 111 and 208 are also equivalent to each other as a gyroscope detection function. Further, the mobile terminal 100 and the in-vehicle apparatus 200 include the digital broadcasting receivers 113 and 210 equivalent to each other as a digital broadcasting reception function and include the digital broadcasting decode applications 117 and 214 equivalent to each other as a decode function. The music reproduction applications 116 and 213 are also equivalent to each other as a music reproduction function.

On the other hand, the in-vehicle apparatus 200 does not have functions equivalent to the illuminance sensor 110 for brightness detection and the navigation 118 that are provided for the mobile terminal 100. The following describes how the control device 114 determines whether the in-vehicle apparatus 200 has functions equivalent to those provided for the mobile terminal 100. The following description relates to the examples of the displays 105 and 204 as the screen display function, the GPS receivers 112 and 209 as the GPS reception function (positioning function), the music reproduction applications 116 and 213 as the music reproduction function, and the digital broadcasting receivers 113 and 210 as the digital broadcasting reception function.

The control device 114 of the mobile terminal 100 communicates with the in-vehicle apparatus 200, acquires a list of functions provided for the in-vehicle apparatus 200, and determines whether the in-vehicle apparatus 200 includes the equivalent functions. Alternatively, the control device 114 may sequentially inquire of the in-vehicle apparatus 200 whether the in-vehicle apparatus 200 has functions equivalent to the screen display function and the GPS reception function. In this case, it is preferable to inquire only the function of the in-vehicle apparatus 200 the user needs to use as an alternative to the function of the mobile terminal 100. For example, the control device 114 does not inquire whether the in-vehicle apparatus 200 has a function equivalent to the music reproduction application 116 if the user needs to continue to use the music reproduction application 116 of the mobile terminal 100.

Figure 5:
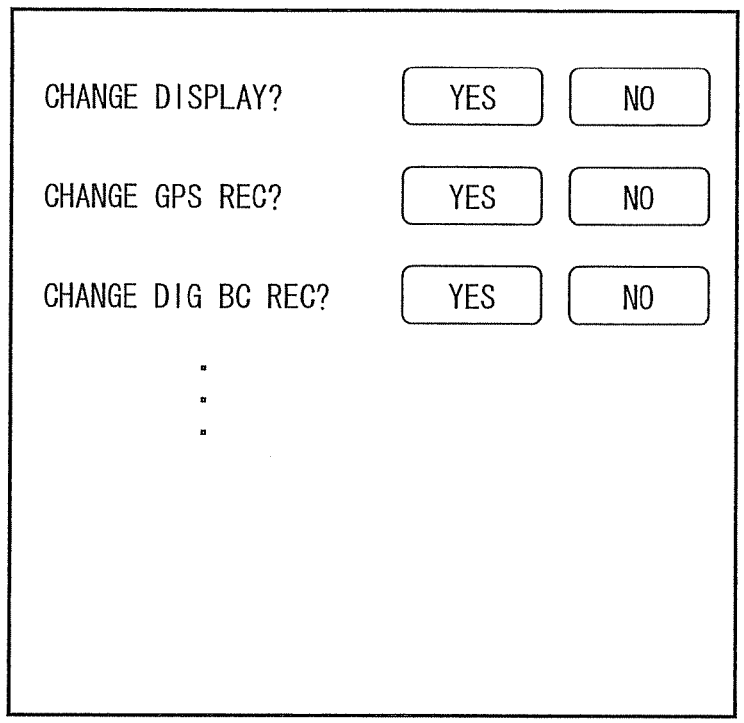
FIG. 5 is a diagram showing a screen display on the mobile terminal.

A possible configuration may allow the user to determine whether the in-vehicle apparatus 200 has an equivalent function. FIG. 5 shows example contents on the display 105 configured for user operations. The control device 114 outputs messages on the display 105 and prompts the user to determine whether to switch from the mobile terminal 100 to the in-vehicle apparatus 200 in order to use the screen display function, the GPS reception function, and the digital broadcasting reception function that consume the power of the mobile terminal 100. If the user selects "Yes" using the display 105 as a touch panel, the control device 114 determines that the in-vehicle apparatus 200 has an equivalent function. If the user selects "Yes," the control device 114 determines that the in-vehicle apparatus 200 does not have an equivalent function.

The control device 114 proceeds to step S16 if it is determined that the in-vehicle apparatus 200 has the equivalent function (Y at step S15). The control device 114 proceeds to step S18 to acquire error information if it is determined that the in-vehicle apparatus 200 does not have the equivalent function (N at step S15).

At step S15, the connector 102 might be connected to the in-vehicle apparatus 200. In this case, the in-vehicle apparatus 200 is assumed to obviously have specific functions of the display 204 and the GPS receiver 209. Based on the assumption, the control device 114 may determine whether the in-vehicle apparatus 200 has an equivalent function.

At step S16 (equivalent to an operation determination means according to the present disclosure), the control device 114 determines whether an equivalent function provided for the in-vehicle apparatus 200 is operating. For example, the display 204 is assumed to be operating if the backlight 203 lights and is capable of displaying information. The GPS receiver 209 is assumed to be operating if it starts receiving a GPS signal. The music reproduction application 213 is assumed to be operating if it has started successfully. The control device 114 communicates with the in-vehicle apparatus 200, acquires information indicating active operations of the functions, and determines whether the equivalent functions are operating on the in-vehicle apparatus 200. The control device 114 proceeds to step S17 if the equivalent functions are determined to be operating (Y at step S16). The control device 114 determines that the equivalent functions are not operating if it receives information about inactive operations from the in-vehicle apparatus 200 or if it cannot receive information about active operations from the in-vehicle apparatus 200 after a lapse of specified time period. The control device 114 then enters a wait state.

Prior to the determination at step S16, the mobile terminal 100 may transmit an instruction to the in-vehicle apparatus 200 so as to operate an equivalent function. The in-vehicle apparatus 200 receives the instruction and operates the specified function. The mobile terminal 100 preferably transmits an operation instruction if the in-vehicle apparatus 200 is not configured to autonomously operate specified functions.

At step S17, the control device 114 suppresses or stops operating an active function of the mobile terminal 100 if the in-vehicle apparatus 200 has an equivalent function. For example, the control device 114 turns off the backlight 104 of the display 105 as the screen display function. Alternatively, the control device 114 may just decrease the brightness of the backlight 104. The control device 114 allows the GPS receiver 112 as the GPS reception function to stop receiving the GPS radio wave. Alternatively, the control device 114 may just increase an interval to receive the GPS radio wave. The control device 114 proceeds to step S18 to acquire error information and then proceeds to step S19 to acquire driving states. These processes will be described later.

The control device 114 need not suppress or stop all functions of the mobile terminal 100 whose equivalent functions are available on the in-vehicle apparatus 200. For example, the control device 114 may not need to stop and may continue to operate the music reproduction application 116 of the mobile terminal 100 even if the in-vehicle apparatus 200 has the music reproduction application 213.

The mobile terminal 100 transmits data to be displayed to the in-vehicle apparatus 200 if the backlight 104 of the display 105 is turned off. It is desirable to start transmitting the data to be displayed before the backlight 104 turns off. The in-vehicle apparatus 200 displays the received data on the display 204.

The control device 114 requests the in-vehicle apparatus 200 to transmit data received from the GPS radio wave if the GPS receiver 112 is to stop receiving the GPS radio wave. It is desirable to issue a request to the in-vehicle apparatus 200 before the GPS receiver 112 stops receiving the GPS radio wave. For example, there may be a case where the mobile terminal 100 has the navigation 118 but the in-vehicle apparatus 200 does not have an equivalent function. In such a case, the GPS receiver 209 of the in-vehicle apparatus 200 receives the GPS radio wave and the navigation 118 of the mobile terminal 100 computes the current location and provides the route guidance. For this purpose, the control device 114 issues a request to the in-vehicle apparatus 200 through communication using the connector 102 so that the in-vehicle apparatus 200 transmits data received by the GPS receiver 209 to the mobile terminal 100. The in-vehicle apparatus 200 receives the request and transmits the data received by the GPS receiver 209 to the mobile terminal 100.

The control device 114 transmits music data to the in-vehicle apparatus 200 if the music reproduction application 116 is to stop. The in-vehicle apparatus 200 stores the received music data in the storage device 212. The music reproduction application 213 reads and reproduces the stored music data.

At step S20, the control device 114 determines whether the mobile terminal 100 is disconnected from the in-vehicle apparatus 200 because the accessory switch of the vehicle is turned off or the mobile terminal 100 is placed outside the vehicle. If a USB connector is used as the connector 102, for example, the control device 114 detects the disconnection when the mobile terminal 100 cannot recognize the in-vehicle apparatus 200. If a Bluetooth connector is used as the connector 102, the control device 114 detects the disconnection when the communication line is disconnected from the in-vehicle apparatus 200. The control device 114 proceeds to step S21 if the disconnection occurs (Y at step S20). The control device 114 returns to step S18 if the connection remains active (N at step S20).

At step S21, the control device 114 allows the mobile terminal 100 to activate its function because the equivalent function was detected on the in-vehicle apparatus at step S17. If the screen display function is inactivated, for example, the control device 114 lights the backlight 104 of the display 105 and restarts the screen display function. If the GPS reception function is inactivated, the control device 114 allows the GPS receiver 112 to restart receiving the GPS radio wave.

Figure 6:
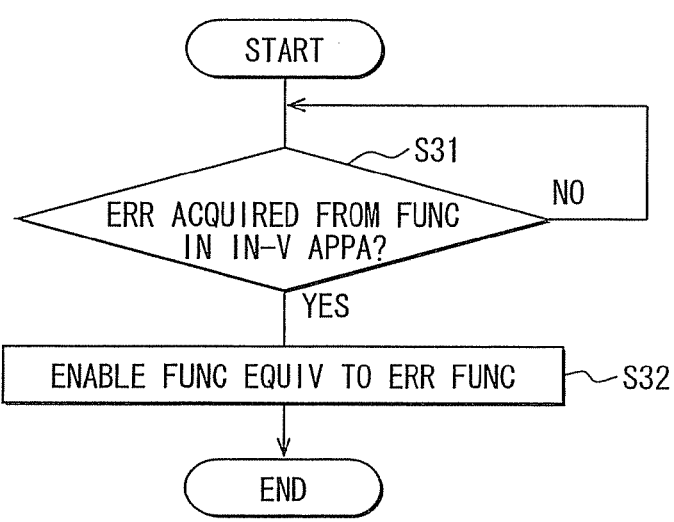
FIG. 6 is a flowchart showing a process of acquiring error information on the mobile terminal.

With reference to FIG. 6, the following describes a process of acquiring error information. FIG. 6 is a flowchart showing the process of the control device 114 in the mobile terminal 100 when acquiring error information from the in-vehicle apparatus 200.

At step S31 (equivalent to an error information acquisition means according to the present disclosure), the control device 114 communicates with the in-vehicle apparatus 200 to acquire error information about a function operating on the in-vehicle apparatus 200. Specifically, the in-vehicle apparatus 200 detects an error concerning the display 204 and transmits the error information to the mobile terminal 100. For example, the in-vehicle apparatus 200 detects a failure in a circuit (not shown) included in the backlight 203 of the display 204 and transmits the error information about the screen display function to the mobile terminal 100. The in-vehicle apparatus 200 transmits the error information about the music reproduction function to the mobile terminal 100 if the music reproduction application 213 abnormally terminates or cannot restart after termination. The mobile terminal 100 receives the error information and recognizes which function glitches in the in-vehicle apparatus 200. The mobile terminal 100 also receives error information detected by the in-vehicle apparatus 200 about the other functions including the GPS reception function. The control device 114 proceeds to step S32 if error information is acquired from the in-vehicle apparatus 200 (Y at step S31). The control device 114 enters a wait state if no error information is acquired (N at step S31).

At step S32, the control device 114 controls the mobile terminal 100 to activate a function whose equivalent function caused an error detected by the in-vehicle apparatus 200. For example, the control device 114 controls the display 105 of the mobile terminal 100 to be active if the control device 114 acquires the error information about the display 204 of the in-vehicle apparatus 200. Specifically, the control device 114 activates a circuit included in the backlight 104 and turns on the backlight 104 to enable the display. The control device 114 allows the GPS receiver 112 of the mobile terminal 100 to start receiving a GPS signal if the control device 114 acquires the error information about the receiver 209 of the in-vehicle apparatus 200. The control device 114 starts the music reproduction application 116 for the mobile terminal 100 if the control device 114 acquires the error information about the music reproduction application 213 for the in-vehicle apparatus 200.

The control device 114 stops transmitting display data from the mobile terminal 100 to the in-vehicle apparatus 200 if the control device 114 acquires the error information about the display 204 of the in-vehicle apparatus 200. Similarly, the control device 114 stops transmitting music data to the in-vehicle apparatus 200 if the control device 114 acquires the error information about the music reproduction application 213.

The function of the in-vehicle apparatus 200 stops immediately when the in-vehicle apparatus 200 detects an error about that function. For example, the GPS receiver 209 stops the reception immediately when the in-vehicle apparatus 200 detects an error about the GPS receiver 209.

Figure 7:
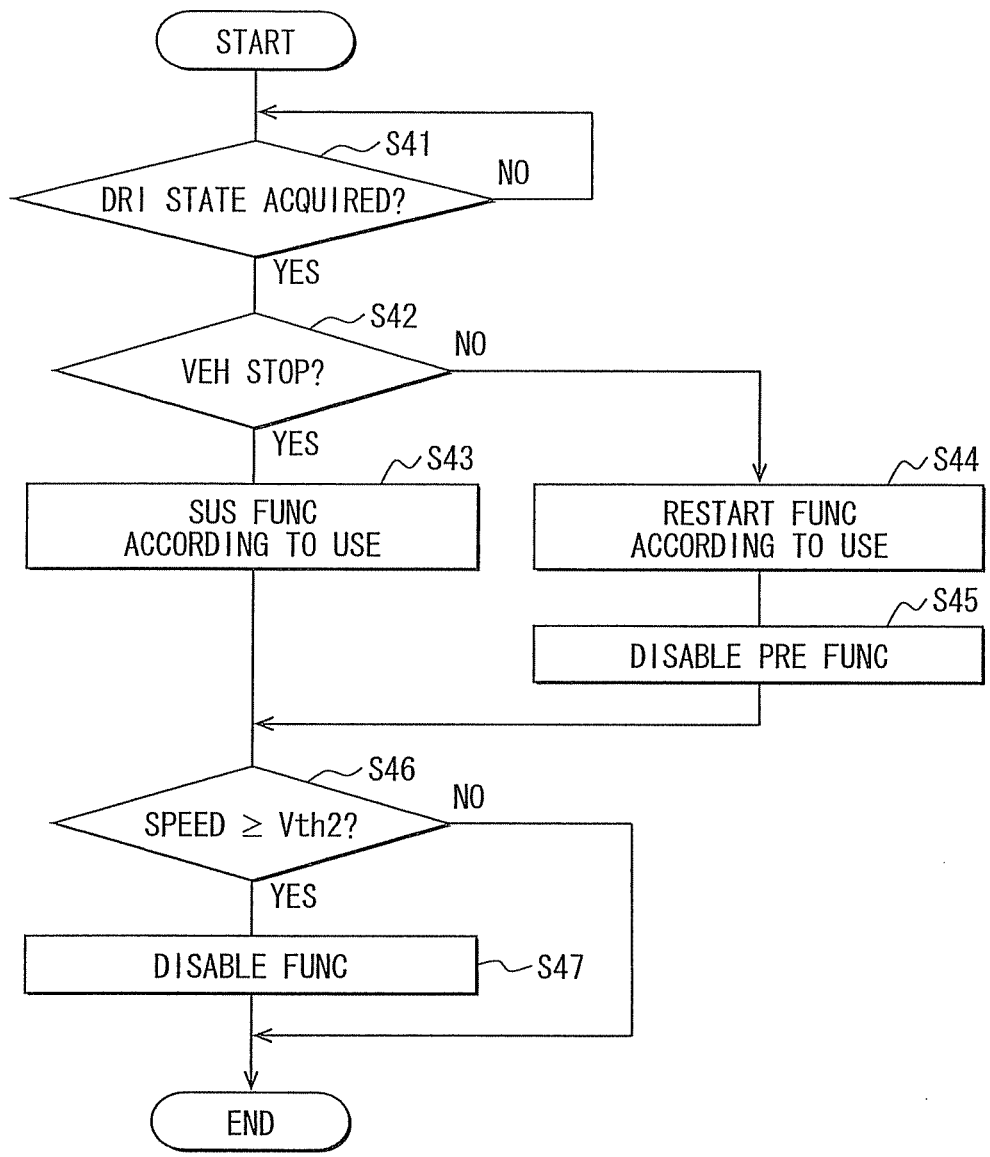
FIG. 7 is a flowchart showing a process of acquiring driving states in the mobile terminal.

With reference to FIG. 7, the following describes a process of acquiring driving states. FIG. 7 is a flowchart showing a process in the control device 114 of the mobile terminal 100 for acquiring driving states from the in-vehicle apparatus 200.

At step S41 (equivalent to a driving state information acquisition means according to the present disclosure), the control device 114 communicates with the in-vehicle apparatus 200 to acquire the driving state of a vehicle where the in-vehicle apparatus 200 is mounted. Specifically, the vehicle speed sensor 206 of the in-vehicle apparatus 200 detects a vehicle speed and the in-vehicle apparatus 200 transmits it to the mobile terminal 100. In addition, the in-vehicle apparatus 200 may transmit a transmission shift position detected by a transmission shift position sensor (not shown) or an on/off-state of a parking break detected by a parking break sensor (not shown) to the mobile terminal 100. The control device 114 proceeds to step S42 if the mobile terminal 100 receives information about the driving states (Y at step S41). The control device 114 enters a wait state if the mobile terminal 100 receives no information about driving states (N at step S41).

At step S42, the control device 114 determines whether the vehicle stops based on the driving state the mobile terminal 100 received. For example, the control device 114 determines that the vehicle is running if the vehicle speed is greater than or equal to a threshold value Vth1 (e.g., 5 km/h). The control device 114 determines that the vehicle stops if the vehicle speed is smaller than the threshold value Vth1. The control device 114 may determine that the vehicle stops if the transmission is shifted to the neutral or parking position or if the parking break is operated. The control device 114 proceeds to step S43 if the vehicle is determined to stop (Y at step S42). The control device 114 proceeds to step S44 if the vehicle is determined to be running (N at step S42).

At step S43, the control device 114 temporarily suspends a function that need not be used while the vehicle stops. For example, the control device 114 allows the GPS receiver 112 to suspend reception of the GPS radio wave because the current location remains unchanged while the vehicle stops.

At step S44, the control device 114 restarts the function that is suspended while the vehicle stops. For example, the control device 114 allows the GPS receiver 112 to restart receiving the GPS radio wave.

The control device 114 may adjust a reception interval on the GPS receiver 112 depending on a vehicle speed while the vehicle is running. The control device 114 sets a long interval at a low vehicle speed and decreases the interval as the vehicle speed increases.

At step S45, the control device 114 stops a function that must not be used while running because the vehicle is detected to be running. Some functions were not disabled at step S14 during connection to the in-vehicle apparatus 200 but must be disabled while running. For example, the control device 114 terminates an animation application such as the incoming call animation 120 because a driver might pay attention to the animation while driving. The terminated function does not restart even if the function state changes while parking in order to prevent the function from starting and terminating frequently.

At step S46, the control device 114 determines whether a vehicle speed is greater than a threshold value Vth2 (e.g., 80 km/h). The control device 114 proceeds to step S47 if the vehicle speed is determined to be greater than the threshold value Vth2. The control device 114 terminates the process if the vehicle speed is determined to be smaller than or equal to the second threshold value Vth2.

At step S47, the control device 114 stops a function of the mobile terminal 100 and starts an equivalent function on the in-vehicle apparatus 200 after the vehicle speed becomes greater than Vth2. In this case, the mobile terminal 100 and the in-vehicle apparatus 200 are supposed to include equivalent functions. For example, the mobile terminal 100 and the in-vehicle apparatus 200 include the digital broadcasting receivers 113 and 209 and the digital broadcasting decode applications 117 and 214 as a digital broadcasting access function (including reception function and decode function). However, the in-vehicle apparatus 200 may ensure the digital broadcasting access function more reliably than the mobile terminal 100 during high-speed running. For example, the digital broadcasting receiver 113 of the mobile terminal 100 might use one tuner. The digital broadcasting receiver 210 of the in-vehicle apparatus 200 might two or four tuners. Accordingly, the control device 114 of the mobile terminal 100 allows the digital broadcasting receiver 113 to stop receiving the broadcast wave and terminates the digital broadcasting decode application 117.

Prior to step S47, the mobile terminal 100 may transmit an instruction to the in-vehicle apparatus 200 so as to activate the digital broadcasting access function. This is desirable if the in-vehicle apparatus 200 is not configured to autonomously activate the requested function.

As mentioned above, the mobile terminal 100 suppresses or stops some of its active functions when it communicably connects to the in-vehicle apparatus 200. This can reduce the power consumption on the mobile terminal 100 while the GPS radio wave is received, for example.

The mobile terminal 100 restores or restarts the functions when it is disconnected from the in-vehicle apparatus 200. The mobile terminal 100 can uninterruptedly supply the user with the functions even if the accessory switch of the vehicle is turned off or the mobile terminal 100 is brought out of the vehicle.

The control device 114 suppresses or stops a function of the mobile terminal 100 if the in-vehicle apparatus 200 has an equivalent function. The in-vehicle apparatus 200 can be configured to operate the equivalent function. It is possible to uninterruptedly supply the user with that function and reduce power consumption of the mobile terminal 100. The gyroscope 208 and the GPS receiver 209 of the in-vehicle apparatus 200 can compute the current location more accurately than the gyroscope 111 and the GPS receiver 112 of the mobile terminal 100. This is because the gyroscope 208 and the GPS receiver 209 of the in-vehicle apparatus 200 are generally installed at an optimized position or angle.

The control device 114 allows the mobile terminal 100 to transmit display data or music data to the in-vehicle apparatus 200 so that the in-vehicle apparatus 200 can use such data to perform the equivalent function. The in-vehicle apparatus 200 can operate the equivalent function in the same usage situation as that available on the mobile terminal 100. It may be preferable to transmit the necessary data to the in-vehicle apparatus 200 before suppressing or stopping the corresponding function in the mobile terminal 100. In addition, it may be preferable to suppress or stop the function in the mobile terminal 100 after confirming operation of the equivalent function in the in-vehicle apparatus 200. For example, the screen display function can shorten a period that interrupts supply of the information to the user.

The control device 114 acquires error information about a function in the in-vehicle apparatus 200 and allows the mobile terminal 100 to perform a function equivalent to the function that caused the error. The function can be provided uninterruptedly.

The control device 114 acquires driving states of a vehicle mounted with the in-vehicle apparatus 200 and suppresses or stops operations of some active functions depending on driving states. This enables to reduce power consumption of the mobile terminal 100 even its function is used. Driving states might cause a performance difference in functions on the mobile terminal 100 and the in-vehicle apparatus 200. Operating the more sophisticated function can provide users with more convenient operating environment.

(First Modification)

There have been described the screen display function, the GPS reception function (positioning function), the music reproduction function, and the digital broadcasting reception function as examples of the first embodiment. The embodiment is also applicable to the speakers 103 and 202 as the audio output function, the switches 106 and 205 as the input function, the acceleration sensors 109 and 207 as the acceleration detection function, and the gyroscopes 111 and 208 as the gyroscope detection function. The following describes only processes unique to these functions and omits duplicate processes described above.

At step S15, the control device 114 successively inquires of the in-vehicle apparatus 200 whether the in-vehicle apparatus 200 has functions equivalent to the audio output function, the input function, the acceleration detection function, and the gyroscope detection function.

At step S17, the control device 114 stops audio output from the speaker 103 if the audio output function is available equivalently. Alternatively, the control device 114 may just decrease a sound volume. The control device 114 stops detection of input operations on the switch 106 if the input function for user input operations is available equivalently. The control device 114 stops detection by the acceleration sensor 109 or the gyroscope 111 if the acceleration detection function or the gyroscope detection function is available equivalently. Alternatively, the control device 114 may just increase a detection interval.

The control device 114 transmits audio output data to the in-vehicle apparatus 200 if the speaker 103 can stop audio output. It is desirable to start transmitting data before the speaker 103 stops audio output The control device 114 requests the in-vehicle apparatus 200 to transmit a result detected in the in-vehicle apparatus 200 if the control device 114 stops detection of input operations on the switch 106 detection by the acceleration sensor 109 or the gyroscope 111. In any of these cases, it is desirable to issue a request before stopping the functions of the mobile terminal 100.

At step S21, the control device 114 restarts audio output if the audio output function is stopped. The control device 114 restarts detection by the switch 106, the acceleration sensor 109, and the gyroscope 111 if the input function, the acceleration detection function, and the gyroscope detection function are stopped, respectively.

At step S32, the control device 114 controls the mobile terminal 100 to output audio from the speaker 103 if the control device 114 acquires error information about the speaker 202 of the in-vehicle apparatus 200. The control device 114 starts detection by the switch 106, the acceleration sensor 109, and the gyroscope 111 of the mobile terminal 100 if the control device 114 acquires error information about the switch 205, the acceleration sensor 207, and the gyroscope 208 of the in-vehicle apparatus 200, respectively.

At step S43, the control device 114 suspends reception of a GPS radio wave by the GPS receiver 112 or detection of an angle or an angular velocity by the gyroscope 111 because the current location remains unchanged while the vehicle stops.

At step S44, the control device 114 restarts reception by the GPS receiver 112 and detection by the gyroscope 111. The control device 114 may adjust an interval of detection by the gyroscope 111 depending on vehicle speeds while the vehicle is running.

(Second Modification)

As mentioned above, the first embodiment stops or suppresses the functions of the mobile terminal 100 if the in-vehicle apparatus 200 has the equivalent functions. The embodiment may be modified as follows.

At step S15, the control device 114 of the mobile terminal 100 determines whether an equivalent function is provided for the in-vehicle apparatus 200 as well as the communication terminal 300 communicably connected to the in-vehicle apparatus 200. The control device 114 communicates with the in-vehicle apparatus 200, acquires a list of functions provided for the communication terminal 300, and determines whether the communication terminal 300 has an equivalent function. Alternatively, the control device 114 may inquire of the in-vehicle apparatus 200 whether the communication terminal 300 has an equivalent function.

As seen from FIGS. 2 and 3, the in-vehicle apparatus 200 does not have a function of detecting brightness. On the other hand, the communication terminal 300 includes the illuminance sensor 110 because the communication terminal 300 is configured equally to the mobile terminal 100. At step S15, the control device 114 determines that the communication terminal 300 has a function equivalent to the illuminance sensor 110 (Y at step S15) and then proceeds to step S16. At step S16, the control device 114 determines that the illuminance sensor 110 of the communication terminal 300 is active (Y at step S16). At step S17, the control device 114 stops brightness detection by the illuminance sensor 110 of the mobile terminal 100.

Similarly, the in-vehicle apparatus 200 does not have a navigation function. The communication terminal 300 includes the navigation 118. At step S16, the control device 114 determines that the navigation 118 of the communication terminal 300 is active (Y at step S16). At step S17, the control device 114 suspends or terminates the navigation 118 of the mobile terminal 100.

The control device 114 requests the communication terminal 300 to transmit a brightness detection result via the in-vehicle apparatus 200 in order to stop brightness detection by the illuminance sensor 110 of the mobile terminal 100. The communication terminal 300 receives the request via the in-vehicle apparatus 200 and transmits a result of brightness detection by the illuminance sensor 110 to the mobile terminal 100 via the in-vehicle apparatus 200.

At step S15, the communication terminal 300 connected to the in-vehicle apparatus 200 may be provided as a mobile telephone. In such a case, the control device 114 may determine whether the communication terminal 300 has an equivalent function assuming that the communication terminal 300 is sure to have a specific function for the display 105 or the illuminance sensor 110.

The mobile terminal 100 can suppress or stop its function if the communication terminal 300 connected to the in-vehicle apparatus 200 has an equivalent function while the in-vehicle apparatus 200 does not have the equivalent function. The mobile terminal 100 can uninterruptedly provide users with the function and reduce its power consumption if the communication terminal 300 is configured to provide the equivalent function. For example, the mobile terminal 100 might provide the stored electric quantity much smaller than that in the batter 107 of the communication terminal 300. Suppressing the power consumption of the mobile terminal 100 can prevent it from being inoperable due to power shortage.

(Second Embodiment)

The first embodiment mainly describes processes in the control device 114 of the mobile terminal 100. The second embodiment mainly describes processes in the control device 211 of the in-vehicle apparatus 200. The mutually corresponding components in the second and the first embodiments are designated by the same reference numerals and a detailed description is omitted for simplicity.

Figure 8:
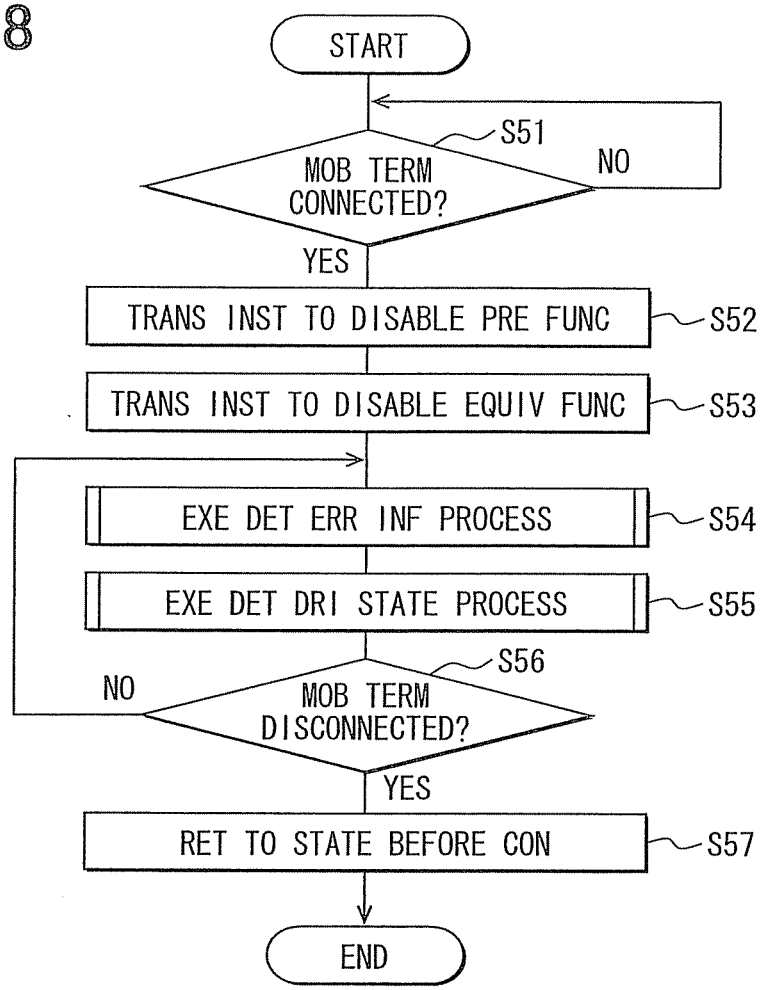
FIG. 8 is a flowchart showing a process flow in the in-vehicle apparatus.

With reference to FIG. 8, the following describes processes performed when the mobile terminal 100 is brought into a vehicle and is connected to the in-vehicle apparatus 200. FIG. 8 is a flowchart showing a process in the control device 211 of the in-vehicle apparatus 200.

At step S51 (equivalent to an in-vehicle connection detection means according to the present disclosure), the control device 211 determines whether the mobile terminal 100 is communicably connected to the in-vehicle apparatus 200. If a USB connector is used as the connector 102, for example, the control device 211 determines successful connection when the in-vehicle apparatus 200 recognizes the mobile terminal 100. If a Bluetooth connector is used as the connector 102, the control device 211 determines successful connection when the in-vehicle apparatus 200 establishes a communication line with the mobile terminal 100. Alternatively, it may be preferable to determine whether the mobile terminal 100 is communicably connected and complies with a Bluetooth profile needed for this process. The control device 211 waits until the connection is determined to be successful (N at step S51). The control device 211 proceeds to step S52 if the connection is determined to be successful (Y at step S51).

At step S52, the control device 211 transmits an instruction to the mobile terminal 100 so as to stop or suppress predetermined functions when the mobile terminal 100 is connected to the in-vehicle apparatus 200. The control device 211 may transmit the instruction to stop or suppress functions that are previously stored in the storage device 212. For example, the control device 211 transmits the instruction to stop the Web browser 121 and the game application 122 that are considered to be unused after a driver gets into his or her vehicle. By contraries, the storage device 212 may previously store functions that are not stopped. The control device 211 may transmit the instruction to stop the other functions. The instruction may suspend or terminate the application itself. Alternatively, the instruction may infrequently execute the application. Decreasing the CPU load improves power saving of the mobile terminal 100.

The control device 211 may just issue a function stop instruction in response to connection to the in-vehicle apparatus 200 without specifying specific functions. The mobile terminal 100 may be configured to determine which function to stop or suppress.

At step S53, the control device 211 instructs the mobile terminal 100 to stop its function whose equivalent function is provided for the in-vehicle apparatus 200. The control device 211 transmits an instruction to the mobile terminal 100 to stop its functions equivalent to the screen display function and the GPS reception function provided for the in-vehicle apparatus 200. The control device 211 controls the in-vehicle apparatus 200 so as to activate its function if the equivalent function is stopped in the mobile terminal 100. The control device 211 proceeds to an error detection process at step S54 and then to a driving state detection process at step S55. These processes will be described later.

For example, the mobile terminal 100 turns off the active backlight 104 of the display 105 or decreases its brightness if the control device 211 instructs the mobile terminal 100 to stop or suppress the screen display function. The control device 211 turns on the backlight 203 so that the display 204 of the in-vehicle apparatus 200 becomes active. The control device 211 allows the display 204 to display visual data transmitted from the mobile terminal 100. The same applies to the music reproduction application 213.

The control device 211 allows the GPS receiver 209 to start receiving a GPS radio wave if the control device 211 instructs the mobile terminal 100 to stop or suppress the GPS reception function. The control device 211 transmits the received data to the mobile terminal 100.

The control device 211 may communicate with the mobile terminal 100 and acquire a list of functions provided for the mobile terminal 100. If the mobile terminal 100 and the in-vehicle apparatus 200 each have an equivalent function, the control device 211 may control the in-vehicle apparatus 200 to activate its function and then instruct the mobile terminal 100 to stop or suppress its equivalent function.

At step S56, the control device 211 determines whether the in-vehicle apparatus 200 is disconnected from the mobile terminal 100 because the mobile terminal 100 is placed outside the vehicle, for example. If a USB connector is used as the connector 201, for example, the control device 211 detects the disconnection when the in-vehicle apparatus 200 cannot recognize the mobile terminal 100. If a Bluetooth connector is used as the connector 201, the control device 211 detects the disconnection when the communication line is disconnected from the mobile terminal 100. The control device 211 proceeds to step S57 if the disconnection occurs (Y at step S56). The control device 211 returns to step S54 if the connection remains active (N at step S56).

At step S57, the control device 211 returns the function operating in the in-vehicle apparatus 200 to the state before the connection to the mobile terminal 100. That is, the control device 211 stops the function that was stopped before communicable connection to the mobile terminal 100 and became active after the connection as an alternative function of the mobile terminal 100. For example, the backlight 203 of the display 204 was off before connection to the mobile terminal 100. The backlight 203 turned on after connection to the mobile terminal 100 as an alternative to the screen display function of the mobile terminal 100. The control device 211 turns off the backlight 203 after disconnection from the mobile terminal 100. The same applies to the speaker 202, the gyroscope 208, the GPS receiver 209, and so on.

By contraries, the control device 211 restarts the function that was active before communicable connection to the mobile terminal 100 and was stopped after the connection because the equivalent function of the mobile terminal 100 was activated.

Figure 9:
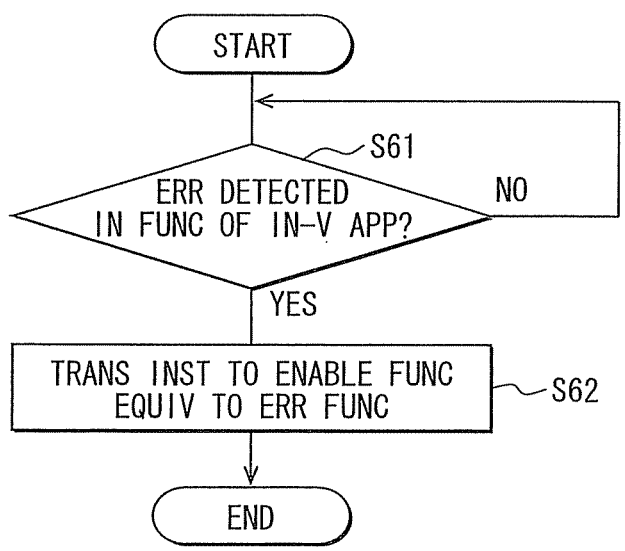
FIG. 9 is a flowchart showing a process of detecting errors in the in-vehicle apparatus.

With reference to FIG. 9, the following describes an error detection process. FIG. 9 is a flowchart showing a process of the control device 211 that detects an error in the in-vehicle apparatus 200.

At step S61 (equivalent to an error detection means according to the present disclosure), the control device 211 detects an error in the function operating on the in-vehicle apparatus 200. For example, the control device 211 detects an error in the screen display function such as disconnection or short-circuiting of a circuit (not shown) included in the backlight 203 of the display 204. The control device 211 detects an error in the acceleration detection function or the gyroscope detection function if the acceleration sensor 207 or the gyroscope 208 detects a value that exceeds a predetermined range of values as a reference. The control device 211 detects an error in the GPS reception function or the digital broadcasting access function if the control device 211 compares the current time managed by the in-vehicle apparatus 200 with time information contained in the data received by the GPS receiver 209 or the digital broadcasting receiver 210 and finds a difference in excess of a predetermined value. The control device 211 detects an error in the music reproduction function if the music reproduction application 213 abnormally terminates or cannot restart after termination. The control device 211 stops the function whose error it detected.

At step S62, the control device 211 transmits an instruction to the mobile terminal 100 so that the mobile terminal 100 operates its function equivalent to the failed function. For example, the control device 211 transmits an instruction to operate the screen display function of the mobile terminal 100 if the control device 211 detects an error in the display 204. The mobile terminal 100 receives this instruction and turns on the backlight 104 of the display 105 so as to be capable of displaying information.

The control device 211 may transmit error information about the function on the in-vehicle apparatus 200 to the mobile terminal 100. The mobile terminal 100 can be configured to autonomously operate its equivalent function based on the received error information.

Figure 10:
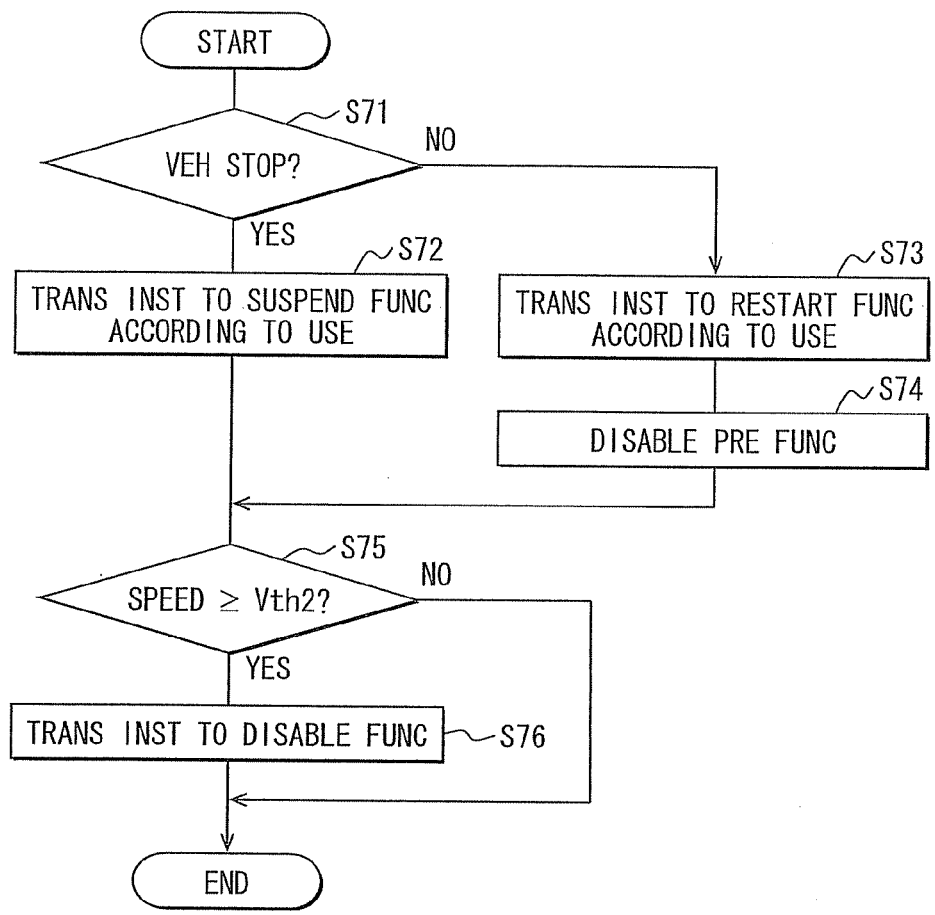
FIG. 10 is a flowchart showing a process of detecting driving states in the in-vehicle apparatus.

With reference to FIG. 10, the following describes a driving state detection process. FIG. 10 is a flowchart showing a process of the control device 211 that detects driving states in the in-vehicle apparatus 200.

At step S71, the control device 211 determines whether the vehicle stops based on a vehicle speed detected by the vehicle speed sensor 206. For example, the control device 211 determines that the vehicle is running if the vehicle speed is greater than or equal to a threshold value Vth1 (e.g., 5 km/h). The control device 114 determines that the vehicle stops if the vehicle speed is smaller than the threshold value Vth1. The control device 114 may determine that the vehicle stops if the transmission is shifted to the neutral or parking position or if the parking break is operated based on a value detected by the transmission shift position sensor or the parking break sensor.

The control device 211 proceeds to step S72 if the vehicle is determined to stop (Y at step S71). The control device 211 proceeds to step S73 if the vehicle is determined to be running (N at step S71).

At step S72, the control device 211 transmits an instruction to the mobile terminal 100 so as to temporarily suspend a function that need not be used while the vehicle stops. For example, the control device 211 transmits an instruction to suspend reception of a GPS radio wave by the GPS receiver 112 or detection of an angle or an angular velocity by the gyroscope 111 because the current location remains unchanged while the vehicle stops. The instruction may suppress, not suspend, an operation. For example, the instruction may be transmitted to the mobile terminal 100 so as to increase a reception interval for the GPS receiver 112 or a detection interval for the gyroscope 111.

At step S73, the control device 211 transmits an instruction to the mobile terminal 100 so as to restart the function that is suspended while the vehicle stops. For example, the control device 211 transmits an instruction to restart receiving a GPS radio wave by the GPS receiver 112 and detecting an angle or an angular velocity by the gyroscope 111.

At step S74, the control device 211 transmits an instruction to stop a function that must not be used while running because the vehicle is detected to be running. Some functions were not disabled at step S52 during connection to the mobile terminal 100 but must be disabled while running. For example, the control device 211 terminates an animation application such as the incoming call animation 120 because a driver might pay attention to the animation while driving. The control device 211 transmits an instruction to the mobile terminal 100 so as to terminate the application. The terminated function does not restart even if the function state changes while parking in order to prevent the function from starting and terminating frequently.

At step S75, the control device 211 determines whether a vehicle speed is greater than a threshold value Vth2 (e.g., 80 km/h). The control device 211 proceeds to step S76 if the vehicle speed is determined to be greater than the threshold value Vth2. The control device 211 terminates the process if the vehicle speed is determined to be smaller than or equal to the second threshold value Vth2.

At step S76, the control device 211 issues an instruction to stop a function of the mobile terminal 100 and starts an equivalent function on the in-vehicle apparatus 200 after the vehicle speed becomes greater than Vth2. In this case, the mobile terminal 100 and the in-vehicle apparatus 200 are supposed to include equivalent functions. For example, the mobile terminal 100 and the in-vehicle apparatus 200 include the digital broadcasting receivers 113 and 209 and the digital broadcasting decode applications 117 and 214 as a digital broadcasting access function. However, the in-vehicle apparatus 200 may ensure the digital broadcasting access function more reliably than the mobile terminal 100 during high-speed running. Accordingly, the control device 211 starts the digital broadcasting decode application 214 and allows the digital broadcasting receiver 210 to start receiving a broadcast wave. The control device 211 transmits an instruction to the mobile terminal 100 so as to stop its digital broadcasting access function. The mobile terminal 100 receives this instruction, allows the digital broadcasting receiver 113 to stop receiving a broadcast wave, and terminates the digital broadcasting decode application 117.

The control device 211 may transmit information about driving states such as the vehicle speed, the transmission shift position, and the parking break state to the mobile terminal 100. The mobile terminal 100 may be configured to autonomously control function operations based on the received driving state information.

As mentioned above, the in-vehicle apparatus 200 communicably connects to the mobile terminal 100 and then suppresses or stops the functions operating on the mobile terminal 100. The mobile terminal 100 can reduce its power consumption after connection to the in-vehicle apparatus 200.

The control device 211 transmits an instruction to the mobile terminal 100 so that the mobile terminal 100 suppresses or stops its function equivalent to that provided for the in-vehicle apparatus 200. The control device 211 controls the in-vehicle apparatus 200 to activate its function if it is stopped. The in-vehicle apparatus 200 can uninterruptedly provide users with the function and reduce power consumption of the mobile terminal 100. The control device 211 restores the functions to the states before the connection if the in-vehicle apparatus 200 is disconnected from the mobile terminal 100. The disconnection occurs if the mobile terminal 100 is brought out of the vehicle, for example. The control device 211 can reduce power consumption of the in-vehicle apparatus 200 by stopping its functions as alternatives to those of the mobile terminal 100.

An error might be detected in the function of the in-vehicle apparatus 200. In this case, the control device 211 transmits an instruction to the mobile terminal 100 so that the mobile terminal 100 operates its equivalent function. The function can be supplied uninterruptedly even though the equivalent function of the in-vehicle apparatus 200 fails.

The control device 211 acquires driving states of the vehicle mounted with the in-vehicle apparatus 200 and transmits an instruction to the mobile terminal 100 so as to suppress or stop its function in accordance with the driving states. This enables to reduce power consumption of the mobile terminal 100 even if its function is used. Driving states might cause a performance difference in functions on the mobile terminal 100 and the in-vehicle apparatus 200. Operating the more sophisticated function can provide users with more convenient operating environment.

(Modification)

As mentioned above, the second embodiment transmits an instruction to the mobile terminal 100 so that the mobile terminal 100 suppresses or stops its function equivalent to that provided for the in-vehicle apparatus 200. The embodiment may be modified as follows.

At step S53, the control device 211 of the in-vehicle apparatus 200 transmits an instruction to the mobile terminal 100 so that the mobile terminal 100 suppresses or stops its function equivalent to that provided for the in-vehicle apparatus 200 as well as the communication terminal 300 communicably connected to the in-vehicle apparatus 200. The control device 211 communicates with the communication terminal 300 and acquires a list of functions provided for the communication terminal 300. The control device 211 transmits the instruction to the mobile terminal 100 so as to suppress or stop its equivalent function and transmits an instruction to the communication terminal 300 so as to operate its function.

For example, the control device 211 may instruct the illuminance sensor 110 of the mobile terminal 100 to stop the brightness detection and instruct the illuminance sensor 110 of the communication terminal 300 to start the brightness detection. In this case, the control device 211 requests the communication terminal 300 to transmit a brightness detection result. The control device 211 then transmits the transmitted brightness detection result to the mobile terminal 100.

The in-vehicle apparatus 200 can transmit an instruction so as to suppress or stop a function in the mobile terminal 100 if the communication terminal 300 connected to the in-vehicle apparatus 200 has the equivalent function even though the in-vehicle apparatus 200 does not have the equivalent function. The in-vehicle apparatus 200 transmits an instruction to the communication terminal 300 to operate the equivalent function. The in-vehicle apparatus 200 can uninterruptedly provide users with the function and reduce power consumption of the mobile terminal 100.

The present disclosure can appropriately combine the components of the above-mentioned embodiments. The combinations can provide many variations.

The above disclosure has the following aspects.

According to a first aspect of the present disclosure, a mobile terminal for communicating with an in-vehicle apparatus includes: a mobile connection detection device for detecting connection between the mobile terminal and the in-vehicle apparatus; and a mobile control device for controlling a plurality of functions, each of which is executed by consuming electric power of the mobile terminal. When the mobile connection detection device detects the connection, the mobile control device suppresses or stops executing one of the functions in the mobile terminal. This enables to save power consumption of the mobile terminal without turning off the mobile terminal when it is brought into a vehicle compartment.

Alternatively, the mobile control device may suppress or stop executing the one of the functions, which is equivalent to a function in the in-vehicle apparatus or a communication terminal connected to the in-vehicle apparatus. The function in the in-vehicle apparatus or the communication terminal is executed by consuming electric power. The function of the in-vehicle apparatus or the communication terminal can replace that of the mobile terminal if an equivalent function is provided for the in-vehicle apparatus or the communication terminal communicably connected to the in-vehicle apparatus. It is possible to uninterruptedly supply users with that function and reduce power consumption of the mobile terminal.

Alternatively, the mobile terminal may further include: an equivalent function determination device for determining whether the in-vehicle apparatus or the communication terminal includes the function equivalent to the one of the functions in the mobile terminal. The mobile control device suppresses or stops executing the one of the functions in the mobile terminal when the equivalent function determination device determines that the in-vehicle apparatus or the communication terminal includes the function equivalent to the one of the functions in the mobile terminal. Further, the mobile terminal may further include: a mobile input device for accepting an input operation from a user. The equivalent function determination device determines that the in-vehicle apparatus or the communication terminal includes the function equivalent to the one of the functions in the mobile terminal when the mobile input device accepts the input operation for utilizing the function in the in-vehicle apparatus or the communication terminal as an alternative way to the one of the functions in the mobile terminal. The specific function is then suppressed or stopped in the mobile terminal. That function can be uninterruptedly supplied to users.

Alternatively, the mobile terminal may further include: an operation determination device for determining whether the function in the in-vehicle apparatus or the communication terminal is running. The mobile control device suppresses or stops executing the one of the functions in the mobile terminal after the operation determination device determines that the function in the in-vehicle apparatus or the communication terminal is running. This can shorten a period during which the function is unavailable to users.

Alternatively, the mobile control device may transmit data for the in-vehicle apparatus to the in-vehicle apparatus when the mobile control device suppresses or stops executing the one of the functions in the mobile terminal. When the specific function represents a screen display function, for example, the function may use a display provided for the in-vehicle apparatus. However, the mobile terminal may store data to be displayed. In this case, the mobile terminal transmits the display data to the in-vehicle apparatus in order to suppress or stop the screen display function of the mobile terminal. The same usage situation as that available on the mobile terminal can be provided when the mobile terminal is taken into a vehicle compartment.

Alternatively, the mobile control device may request the in-vehicle apparatus to transmit data for the mobile terminal when the mobile control device suppresses or stops executing the one of the functions in the mobile terminal. When the specific function represents a GPS reception function (positioning function), for example, the in-vehicle apparatus receives a GPS radio wave or performs positioning as the GPS reception function. However, the mobile terminal may searches for a route from the current location to a destination. In this case, the mobile terminal requests the in-vehicle apparatus to transmit data concerning the current location before suppressing or stopping the screen display function of the mobile terminal. This enables to provide the same function as that available before the mobile terminal is connected to the in-vehicle apparatus.

Alternatively, the mobile terminal may further include: an error information acquisition device for acquiring error information about the function in the in-vehicle apparatus or the communication terminal. The mobile control device cancels suppression or stoppage of the one of the functions in the mobile terminal based on the error information so that the one of the functions in the mobile terminal is executed. The function can be supplied uninterruptedly even if an error occurs in the function operating on the in-vehicle apparatus or the communication terminal.

Alternatively, the mobile connection detection device may detect disconnection with the in-vehicle apparatus. When the mobile connection detection device detects the disconnection, the mobile control device cancels suppression or stoppage of the one of the functions in the mobile terminal so that the one of the functions in the mobile terminal is executed. The mobile terminal reactivates the suppressed or stopped specific function and returns to the state before the connection to the in-vehicle apparatus when the mobile terminal is taken out of the vehicle or an accessory switch of the vehicle is turned off. This can improve the convenience for users.

Alternatively, the mobile terminal may further include: a driving state information acquisition device for acquiring information about a driving state of a vehicle from the in-vehicle apparatus. The mobile control device suppresses or stops executing the one of the functions in the mobile terminal in accordance with the information about the driving state. Further, the mobile control device may increase a degree of suppression of the one of the functions in the mobile terminal as a vehicle speed in the information about the driving state decreases. Furthermore, the mobile control device may stop executing the one of the functions in the mobile terminal when the driving state information acquisition device acquires the information that the vehicle stops driving. If the in-vehicle apparatus or the communication terminal includes a function equivalent to that of the mobile terminal, the function of the in-vehicle apparatus or the communication terminal is used instead of the function of the mobile terminal. This can reduce power consumption of the mobile terminal. In the above cases, power consumption of the mobile terminal is reduced even if the function of the mobile terminal remains active because the in-vehicle apparatus or the communication terminal does not include the function equivalent to that of the mobile terminal, for example.

Alternatively, the mobile control device may stop executing the one of the functions in the mobile terminal when the mobile control device determines that a vehicle speed in the information about the driving state is equal to or higher than a predetermined threshold value. An equivalent function included in the in-vehicle apparatus may provide higher performance during high-speed running, for example. The user can enjoy more convenient environment by using the equivalent function of the in-vehicle apparatus instead of the function of the mobile terminal. The high-speed running relates to a vehicle speed for running on highways. For example, approximately 80 km/h may be specified as a threshold value. Running at a speed higher than or equal to this threshold value may be assumed as the high-speed running.

Alternatively, the mobile terminal may further include: a mobile storage device for storing information, which indicates the one of the functions in the mobile terminal. The mobile control device suppresses or stops executing the one of the functions in the mobile terminal, which corresponds to the information stored in the mobile storage device. Further, the mobile terminal may further include: a mobile input device for accepting an input operation from a user. The mobile storage device stores the information, which is input by the user via the mobile input device. In the above cases, these enable to automatically suppress or stop functions not used aboard and reduce power consumption of the mobile terminal.

Alternatively, the one of the functions in the mobile terminal may be provided by an application software running on an operating system, which is installed in the mobile terminal. The mobile control device suppresses executing the application software by reducing a process repetition, stops executing the application by stopping a process in the application software, or stops executing the application software by terminating an activation of the application software. Decreasing loads on the CPU can reduce power consumption.

Alternatively, the one of the functions in the mobile terminal may include at least one of a screen display function of displaying information on a screen, an audio output function of outputting a sound, an input function of accepting an input operation from a user, an acceleration detection function of detecting acceleration, a gyroscope detection function of detecting a magnitude of rotational motion, a brightness detection function of detecting brightness, a GPS reception function of receiving a radio wave from a GPS satellite, and a digital broadcasting reception function of receiving a digital broadcast signal. Further, the mobile terminal may further include: a display; and a mobile illumination device for illuminating the display. Suppression or stoppage of the one of the functions in the mobile terminal is to decrease illumination brightness or to turn off the mobile illumination device. Further, the mobile terminal may further include: a speaker. Suppression or stoppage of the one of the functions in the mobile terminal is to decrease a volume of audio output from the speaker or to stop the audio output. Further, the mobile terminal may further include: a mobile input device for accepting the input operation from the user. Stoppage of the one of the functions in the mobile terminal is to stop accepting the input operation. Further, the mobile terminal may further include: an acceleration sensor that detects acceleration. Suppression or stoppage of the one of the functions in the mobile terminal is to reduce repetition of detecting the acceleration or to stop detecting the acceleration. Further, the mobile terminal may further include: a gyroscope that detects a magnitude of rotational motion. Suppression or stoppage of the one of the functions in the mobile terminal is to reduce repetition of detecting the magnitude of rotational motion or to stop detecting the magnitude of rotational motion. Further, the mobile terminal may further include: an illuminance sensor that detects brightness. Suppression or stoppage of the one of the functions in the mobile terminal is to reduce repetition of detecting the brightness or to stop detecting the brightness. Further, the mobile terminal may further include: a GPS receiver that receives a radio wave from a GPS satellite. Suppression or stoppage of the one of the functions in the mobile terminal is to reduce repetition of receiving the radio wave or to stop receiving the radio wave. Further, the mobile terminal may further include: a digital broadcasting receiver that receives a digital broadcast signal. Stoppage of the one of the functions in the mobile terminal is to stop receiving the digital broadcast signal. In the above cases, suppressing or stopping the functions can reduce power consumption of the mobile terminal.

According to a second aspect of the present disclosure, an in-vehicle apparatus for communicating with a portable mobile terminal, includes: an in-vehicle connection detection device for detecting connection between the in-vehicle apparatus and the mobile terminal; and an in-vehicle control device for transmitting an instruction signal to the mobile terminal. The instruction signal represents a control of a plurality of functions in the mobile terminal, the functions executed by consuming electric power of the mobile terminal, and when the in-vehicle connection detection device detects the connection, the in-vehicle control device transmits the instruction signal to the mobile terminal so as to suppress or stop executing one of the functions in the mobile terminal. This enables to save power consumption of the mobile terminal without turning off the mobile terminal when it is brought into a vehicle compartment.

According to a third aspect of the present disclosure, a communication system includes: an in-vehicle apparatus mounted on a vehicle; and a mobile terminal for communicating with the in-vehicle apparatus. The in-vehicle apparatus includes: a vehicle connection detection device for detecting connection between the in-vehicle apparatus and the mobile terminal; and an in-vehicle control device that controls a first function in the in-vehicle apparatus, the first function executed by consuming electric power. The mobile terminal includes: a mobile connection detection device for detecting connection between the mobile terminal and the in-vehicle apparatus; and a mobile control device for controlling a second function in the mobile terminal, the second function executed by consuming electric power of the mobile terminal, and equivalent to the first function. When the vehicle connection detection device detects the connection, the in-vehicle control device controls the first function to be active. When the mobile connection detection device detects the connection, the mobile control device controls the second function to suppress or stop executing the second function. This enables to save power consumption of the mobile terminal without turning off the mobile terminal when it is brought into a vehicle compartment.

According to a fourth aspect of the present disclosure, a computer readable medium comprising instructions being executed by a computer, the instructions including a computer-implemented method for controlling a mobile terminal to communicate with an in-vehicle apparatus mounted on a vehicle, wherein the mobile terminal includes: a mobile connection detection device for detecting connection between the mobile terminal and the in-vehicle apparatus; and a mobile control device for controlling a plurality of functions, each of which is executed by consuming electric power of the mobile terminal, the instructions includes: controlling the mobile control device to suppress or stop executing one of functions in the mobile terminal when the mobile connection detection device detects the connection. This enables to save power consumption of the mobile terminal without turning off the mobile terminal when it is brought into a vehicle compartment.

According to a fifth aspect of the present disclosure, a method for controlling a plurality of functions in a mobile terminal, which communicates with an in-vehicle apparatus mounted on a vehicle, the functions executed by consuming electric power of the mobile terminal, the method includes: detecting connection between the mobile terminal and the in-vehicle apparatus; and suppressing or stopping execution of one of the functions in the mobile terminal when the connection is detected between the mobile terminal and the in-vehicle apparatus. This enables to save power consumption of the mobile terminal without turning off the mobile terminal when it is brought into a vehicle compartment.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A mobile terminal for communicating with an in-vehicle apparatus comprising:
   a mobile connection detection device for detecting connection between the mobile terminal and the in-vehicle apparatus; and
   a mobile control device for controlling a plurality of functions, each of which is executed by consuming electric power of the mobile terminal,
   wherein, when the mobile connection detection device detects the connection, the mobile control device suppresses or stops executing one of the functions in the mobile terminal;
   wherein the mobile control device suppresses or stops executing the one of the functions, which is equivalent to a function in the in-vehicle apparatus or a communication terminal connected to the in-vehicle apparatus, and
   wherein the function in the in-vehicle apparatus or the communication terminal is executed by consuming electric power; the mobile terminal further comprising:
   an equivalent function determination device for determining whether the in-vehicle apparatus or the communication terminal includes the function equivalent to the one of the functions in the mobile terminal, and
   wherein the mobile control device suppresses or stops executing the one of the functions in the mobile terminal when the equivalent function determination device determines that the in-vehicle apparatus or the communication terminal includes the function equivalent to the one of the functions in the mobile terminal.

2. The mobile terminal according to claim 1, further comprising:
   a mobile input device for accepting an input operation from a user, wherein the equivalent function determination device determines that the in-vehicle apparatus or the communication terminal includes the function equivalent to the one of the functions in the mobile terminal when the mobile input device accepts the input operation for utilizing the function in the in-vehicle apparatus or the communication terminal as an alternative way to the one of the functions in the mobile terminal.

3. The mobile terminal according to claim 1, further comprising:
an operation determination device for determining whether the function in the in-vehicle apparatus or the communication terminal is running,
wherein the mobile control device suppresses or stops executing the one of the functions in the mobile terminal after the operation determination device determines that the function in the in-vehicle apparatus or the communication terminal is running.

4. The mobile terminal according to claim 1,
wherein the mobile control device transmits data for the in-vehicle apparatus to the in-vehicle apparatus when the mobile control device suppresses or stops executing the one of the functions in the mobile terminal.

5. The mobile terminal according to claim 1,
wherein the mobile control device requests the in-vehicle apparatus to transmit data for the mobile terminal when the mobile control device suppresses or stops executing the one of the functions in the mobile terminal.

6. The mobile terminal according to claim 1, further comprising:
an error information acquisition device for acquiring error information about the function in the in-vehicle apparatus or the communication terminal,
wherein the mobile control device cancels suppression or stoppage of the one of the functions in the mobile terminal based on the error information so that the one of the functions in the mobile terminal is executed.

7. The mobile terminal according to claim 1,
wherein the mobile connection detection device detects disconnection with the in-vehicle apparatus, and
wherein, when the mobile connection detection device detects the disconnection, the mobile control device cancels suppression or stoppage of the one of the functions in the mobile terminal so that the one of the functions in the mobile terminal is executed.

8. The mobile terminal according to claim 1, further comprising:
a driving state information acquisition device for acquiring information about a driving state of a vehicle from the in-vehicle apparatus,
wherein the mobile control device suppresses or stops executing the one of the functions in the mobile terminal in accordance with the information about the driving state.

9. The mobile terminal according to claim 8,
wherein the mobile control device increases a degree of suppression of the one of the functions in the mobile terminal as a vehicle speed in the information about the driving state decreases.

10. The mobile terminal according to claim 8,
wherein the mobile control device stops executing the one of the functions in the mobile terminal when the driving state information acquisition device acquires the information that the vehicle stops driving.

11. The mobile terminal according to claim 8,
wherein the mobile control device stops executing the one of the functions in the mobile terminal when the mobile control device determines that a vehicle speed in the information about the driving state is equal to or higher than a predetermined threshold value.

12. The mobile terminal according to claim 1, further comprising:
a mobile storage device for storing information, which indicates the one of the functions in the mobile terminal,
wherein the mobile control device suppresses or stops executing the one of the functions in the mobile terminal, which corresponds to the information stored in the mobile storage device.

13. The mobile terminal according to claim 12, further comprising:
a mobile input device for accepting an input operation from a user,
wherein the mobile storage device stores the information, which is input by the user via the mobile input device.

14. The mobile terminal according to claim 1,
wherein the one of the functions in the mobile terminal is provided by an application software running on an operating system, which is installed in the mobile terminal, and
wherein the mobile control device suppresses executing the application software by reducing a process repetition, stops executing the application by stopping a process in the application software, or stops executing the application software by terminating an activation of the application software.

15. The mobile terminal according to claim 1,
wherein the one of the functions in the mobile terminal includes at least one of a screen display function of displaying information on a screen, an audio output function of outputting a sound, an input function of accepting an input operation from a user, an acceleration detection function of detecting acceleration, a gyroscope detection function of detecting a magnitude of rotational motion, a brightness detection function of detecting brightness, a GPS reception function of receiving a radio wave from a GPS satellite, and a digital broadcasting reception function of receiving a digital broadcast signal.

16. The mobile terminal according to claim 15, further comprising:
a display; and
a mobile illumination device for illuminating the display,
wherein suppression or stoppage of the one of the functions in the mobile terminal is to decrease illumination brightness or to turn off the mobile illumination device.

17. The mobile terminal according to claim 15, further comprising:
a speaker,
wherein suppression or stoppage of the one of the functions in the mobile terminal is to decrease a volume of audio output from the speaker or to stop the audio output.

18. The mobile terminal according to claim 15, further comprising:
a mobile input device for accepting the input operation from the user,
wherein stoppage of the one of the functions in the mobile terminal is to stop accepting the input operation.

19. The mobile terminal according to claim 15, further comprising:
an acceleration sensor that detects acceleration,
wherein suppression or stoppage of the one of the functions in the mobile terminal is to reduce repetition of detecting the acceleration or to stop detecting the acceleration.

20. The mobile terminal according to claim 15, further comprising:
a gyroscope that detects a magnitude of rotational motion,
wherein suppression or stoppage of the one of the functions in the mobile terminal is to reduce repetition of detecting the magnitude of rotational motion or to stop detecting the magnitude of rotational motion.

21. The mobile terminal according to claim 15, further comprising:
an illuminance sensor that detects brightness,
wherein suppression or stoppage of the one of the functions in the mobile terminal is to reduce repetition of detecting the brightness or to stop detecting the brightness.

22. The mobile terminal according to claim 15, further comprising:
a GPS receiver that receives a radio wave from a GPS satellite,
wherein suppression or stoppage of the one of the functions in the mobile terminal is to reduce repetition of receiving the radio wave or to stop receiving the radio wave.

23. The mobile terminal according to claim 15, further comprising:
a digital broadcasting receiver that receives a digital broadcast signal,
wherein stoppage of the one of the functions in the mobile terminal is to stop receiving the digital broadcast signal.

24. An in-vehicle apparatus for communicating with a portable mobile terminal, comprising:
an in-vehicle connection detection device for detecting connection between the in-vehicle apparatus and the mobile terminal; and
an in-vehicle control device for transmitting an instruction signal to the mobile terminal,
wherein the instruction signal represents a control of a plurality of functions in the mobile terminal, the functions executed by consuming electric power of the mobile terminal,
wherein, when the in-vehicle connection detection device detects the connection, the in-vehicle control device transmits the instruction signal to the mobile terminal so as to suppress or stop executing one of the functions in the mobile terminal;
wherein the in-vehicle control device transmits the instruction signal to the mobile terminal so as to suppress or stop executing the one of the functions in the mobile terminal, which is equivalent to a function in the in-vehicle apparatus or a communication terminal connected to the in-vehicle apparatus,
wherein the function in the in-vehicle apparatus or the communication terminal is executed by consuming electric power; and
wherein the in-vehicle control device transmits the instruction signal to the mobile terminal so as to suppress or stop executing the one of the functions in the mobile terminal after the in-vehicle control device controls the in-vehicle apparatus or the communication terminal to activate the function in the in-vehicle apparatus or the communication terminal, which is equivalent to the one of the functions in the mobile terminal.

25. The in-vehicle apparatus according to claim 24, further comprising:
an error detection device for detecting an error concerning the function in the in-vehicle apparatus or the communication terminal,
wherein the in-vehicle control device transmits the instruction to the mobile terminal so as to cancel suppression or stoppage of the one of the functions in the mobile terminal so that the one of the functions in the mobile terminal is executed, the one of the functions being equivalent to the function in the in-vehicle apparatus or the communication terminal, in which the error detection device detects the error.

26. The in-vehicle apparatus according to claim 24,
wherein the in-vehicle connection detection device detects disconnection with the mobile terminal, and
wherein, when the in-vehicle connection detection device detects the disconnection, the in-vehicle control device recovers the function in the in-vehicle apparatus or the communication terminal equivalent to the one of functions in the mobile terminal so that a state before the in-vehicle connection detection device detects the connection is recovered.

27. The in-vehicle apparatus according to claim 24, further comprising:
a driving state detection device for detecting a driving state of a vehicle,
wherein the in-vehicle control device transmits the instruction to the mobile terminal so as to suppress or stop executing the one of the functions in the mobile terminal in accordance with the driving state.

28. A communication system comprising:
an in-vehicle apparatus mounted on a vehicle; and
a mobile terminal for communicating with the in-vehicle apparatus,
wherein the in-vehicle apparatus includes:
a vehicle connection detection device for detecting connection between the in-vehicle apparatus and the mobile terminal; and
an in-vehicle control device that controls a first function in the in-vehicle apparatus, the first function executed by consuming electric power,
wherein the mobile terminal includes:
a mobile connection detection device for detecting connection between the mobile terminal and the in-vehicle apparatus; and
a mobile control device for controlling a second function in the mobile terminal, the second function executed by consuming electric power of the mobile terminal, and equivalent to the first function,
wherein, when the vehicle connection detection device detects the connection, the in-vehicle control device controls the first function to be active,
wherein, when the mobile connection detection device detects the connection, the mobile control device controls the second function to suppress or stop executing the second function;
wherein the in-vehicle apparatus includes an error detection device for detecting an error in the first function,
wherein the mobile terminal includes an error information acquisition device for acquiring error information about the first function from the in-vehicle apparatus,
wherein the in-vehicle control device stops executing the first function when the error detection device detects the error in the first function, and
wherein the mobile control device controls the second function to be active when the error information acquisition device acquires the error information.

29. The communication system according to claim 28,
wherein the in-vehicle apparatus includes a driving state detection device for detecting a driving state of the vehicle;
wherein the mobile terminal includes a driving state information acquisition device for acquiring information about the driving state from the in-vehicle apparatus;

wherein the in-vehicle control device controls the first function to be active based on the driving state, and wherein the mobile control device suppresses or stops executing the second function based on the information about the driving state.

\* \* \* \* \*